United States Patent Office 2,816,610
Patented Dec. 17, 1957

2,816,610

MINIMIZING WATER FLOW INTO OIL WELLS

Henry B. Fisher, Bartlesville, Okla., assignor to Phillips Petroleum Company, a corporation of Delaware No Drawing. Application August 2, 1954,
Serial No. 447,414

4 Claims. (Cl. 166—9)

This invention relates to production of crude oil. In one of its aspects this invention relates to a method for decreasing the flow of water into crude oil producing wells. In another aspect it relates to a method for decreasing the permeability of crude oil bearing formations to the passage of water and increasing the permeability of said formations to the passage of the oil. It further relates to a method for plugging formations against the flow of water.

In drilling oil wells the well is occasionally drilled beyond the oil producing formation and into a water containing formation. Water which enters the well must be pumped from the well along with the oil. In some cases when oil well drilling is stopped while the bottom of the bore hole is yet within the oil bearing formation water can sometimes enter the well through the portion of the oil bearing formation separating the bottom of the bore hole and a lower water bearing formation. Frequently water enters a well only after oil has been produced for a period of time, or the water/oil ratio increases as production is continued. In any event, entry of water into an oil well is undesirable because it has to be produced along with the oil and pumping and handling of the water are expensive items.

In secondary crude oil recovery operations wherein the secondary recovery is carried out by water flooding, water, which enters the output wells, must be pumped therefrom along with the oil. In either of these cases all of the water which enters the well bore must be pumped from the well and the pumping of water from an oil well adversely affects oil production costs. Any operation which can reduce the amount of water entering an oil well is greatly desired.

An object of my invention is to provide a method for reducing the amount of water entering oil wells.

Another object of my invention is to provide a method for eliminating or at least minimizing the flow of water into an oil well from levels above, below or in the oil producing formation.

Still another object of my invention is to provide a method for reducing the amount of water entering output wells in a secondary crude oil production operation by water flooding.

Yet another object of my invention is to decrease the permeability of oil producing formations to water and simultaneously increasing their permeability to crude oil.

Still another object of my invention is to provide a method for making oil bearing formations, or the pore space of oil bearing formations which is wet with water less permeable to water and more permeable to crude oil.

Still other objects and advantages of my invention will be realized by those skilled in the art upon reading the following description illustrating the principles involved and specific embodiments of my invention.

I accomplish these and other objects and advantages by providing a method for decreasing the flow of water from a water-containing formation into an oil well comprising introducing an aqueous solution of a water soluble alkali metal salt of methyl siliconic acid into said formation. Objects of the invention are further achieved by introducing into the water and/or oil bearing formation an aqueous solution containing a minor but effective amount of an agent for decreasing the flow of water into the well comprising a water soluble alkali metal salt of methyl siliconic acid and subsequently producing oil and water from said well in a higher oil-to-water ratio than the ratio of oil-to-water produced prior to introduction of said water soluble salt into said formation.

As an example of the operation of the process of my invention I will describe operations for reducing the flow of water into oil wells using sodium methyl siliconate as the alkali metal salt of methyl siliconic acid. While I will so describe the operation of my invention employing sodium methyl siliconate I can, under some conditions, use other alkali metal salts of methyl siliconic acid, for example, potassium methyl siliconate, lithium methyl siliconate, rubidium methyl siliconate and cesium methyl siliconate. Costs at the present time might, for the most part, rule out the use of the cesium and rubidium salts. Similarly while the lithium and potassium salts are not generally as expensive as the cesium and rubidium salts, yet these more common salts would probably not be used because sodium salts are in general less expensive even than potassium salts. Thus, I will describe the operation of my invention using sodium methyl siliconate as a water retarding material.

Oil soluble materials have been used in attempts to minimize or to decrease the rate of entrance of water into oil wells but it is believed quite advantageous to use water soluble materials for such operations. Water soluble materials such as those herein disclosed are better for decreasing water flow in water-wet portions of formations than oil soluble materials because the injected aqueous solutions are easily miscible with the water already wetting the pore walls while an oil soluble material in oil solution is believed transferred with difficulty to the pore walls which are wet with water.

Upon injection of a water solution of sodium methyl siliconate into a water-wet formation it is not known whether the siliconate is merely precipitated on the water-wet pore walls, or merely deposited on the water-wet pore walls due to some unknown solubility decreasing agent, or whether a material is deposited on the water-wet pore walls by chemical reaction with a material in the water wetting the pore walls or by chemical reaction with constituents of the pore walls. I do not wish to be limited by any particular explanation offered as to why use of sodium methyl siliconate decreases water flow with the simultaneous increase of oil flow in subterranean formations.

The above mentioned methyl siliconic acid can be represented by the following general formula:

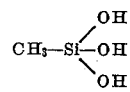

While the sodium methyl siliconate of my invention is believed to be the monosodium salt of methyl siliconic acid and as termed hereinbefore, sodium methyl siliconate is believed to have the following general formula:

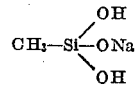

This formula indicates that this material is actually a salt and since salts are ionized to at least a slight extent, this sodium salt can be illustrated in ionic form as

While it is believed the commercial product is largely the monosodium methyl siliconate, the solution also contains the di-sodium and the tri-sodium salts. The relative concentrations of these three salts will depend at least in part, on the mode of manufacture. Concentrated solutions of these siliconates are believed to contain polymeric siliconates.

As mentioned hereinbefore this monosodium siliconate, called sodium methyl siliconate, is very soluble in water, for example, at least as much as 20 percent dissolves in water. Such a solution is quite viscous and I prefer to use solutions containing smaller concentrations of the siliconate. By using solutions of smaller concentrations than 20%, I am able to inject such solutions into the subterranean formations by employing lower pressures than when more concentrated and more viscous solutions are used.

For reducing or minimizing the flow of water into an oil well from the level of the oil bearing formation or from a level near the oil bearing formation, I pump an aqueous solution of sodium methyl siliconate, preferably down a tubing, to a point near the bottom of the well. If the water is entering the well from the bottom or through, for example, the bottom two or three feet, this portion of the well is impregnated with the sodium methyl siliconate solution by pressuring. This pressuring operation can be continued by addition of more aqueous sodium methyl siliconate to replace that entering the formation until such time that the operator believes a sufficient amount of the material has entered the formation. The pressuring operation is then stopped, the addition of the siliconate is also stopped and all aqueous material removed from the tubing and the oil well pump is started. When all of the aqueous material has been pumped from the well down to the level of the pump inlet oil then begins to be produced. If the injection of the aqueous sodium methyl siliconate has been sufficient, the oil-to-water ratio of the material subsequently pumped is greater than the oil-to-water ratio of the material pumped from the well prior to injection of the sodium methyl siliconate. Under some conditions more of the sodium methyl siliconate solution is required than under other conditions, for example, to minimize flow of water through relatively permeable formation ordinarily requires larger amounts of the siliconate solution than are required for less permeable formations. Similarly, it is preferred in some cases when treating more permeable formations to use sodium methyl siliconate solutions of higher siliconate concentration than when treating less permeable formations. While concentrations as high as 20 percent siliconate in water are used, it is ordinarily preferred to use solutions of considerably lower concentrations, for example, aqueous solutions containing one percent or even as low as .01 of one percent can under some conditions, be used.

While it might be reasoned that the use of a larger quantity of aqueous solution containing a lower concentration of sodium methyl siliconate might be the equivalent of a smaller quantity of solution containing a higher concentration of the siliconate, such is not necessarily the case. It can under some conditions be advantageous to employ, for example, in water flooding operations injection water containing a very small concentration of siliconate. In a secondary water flooding operation use of high concentrations of the siliconate might be prohibitive for economic reasons.

As mentioned, sodium methyl siliconate solutions, such as herein disclosed, can be used in water flooding operation. In such an operation, usually a dilute but effective aqueous solution of the material is injected into the injection well and the aqueous solution is pressured from this well into the oil bearing formation as water is pressured in ordinary water flooding operations. Since the sodium methyl siliconate reduces the permeability of the formation for water and increases it for oil, upon continued injection of aqueous sodium methyl siliconate into the input well the rate of inflow of water into an output well decreases while the inflow of crude oil into this output well simultaneously increases with the result that the ratio of the oil-to-water produced from the output well increases over the ratio of oil-to-water produced prior to injection of the siliconate solution.

In water flooding operations, under some conditions, it is desirable to introduce continuously a very dilute but effective sodium methyl siliconate solution into an injection well, while under other conditions it is desirable to alternate injection of the siliconate solution with water. Under still other conditions, it is desirable to make only one or two injections of the siliconate solution followed by water injection.

The aqueous sodium siliconate solution of my invention is also used in plugging or in partially plugging a formation against the flow of water. To carry out a plugging operation it is merely necessary to inject an aqueous solution of sodium methyl siliconate into the formation and follow this injection with a quantity of an aqueous solution of a mineral acid, such as hydrochloric acid, nitric acid, phosphoric acid or sulfuric acid, or an aqueous solution of an organic acid, such as acetic acid, formic acid or propionic acid, or other relatively inexpensive acid. Because sulfuric acid tends to precipitate calcium sulfate from lime containing solutions it is preferable to use hydrochloric acid for this precipitating operation. When the hydrochloric acid solution enters the formation containing the sodium methyl siliconate a precipitation reaction occurs with the deposition of methyl siliconic acid. Reaction of the sodium methyl siliconate with hydrochloric acid occurs because methyl siliconic acid is a very weak acid and precipitation occurs because methyl siliconic acid is quite insoluble in water.

Pores of formations can, if desired, be completely or substantially completely plugged by using a high concentration of the aqueous sodium methyl siliconate solution followed by the precipitation acid wherein large quantities of methyl siliconic acid are precipitated in the pores. Also complete or substantially complete plugging can be accomplished by alternately introducing dilute aqueous sodium methyl siliconate solutions and precipitation acid. Such alternate additions of siliconate solution and acid are continued until a desired amount of plugging has been accomplished. Water is then introduced into the well in case it is a water flood input well, or oil production is started in case the well is an output well.

More permeable portions of formations can be selectively plugged relative to less permeable portions by use of the transient back pressure phenomenon which occurs when injection into an injection well is stopped and pressure on the well decreased. Upon decrease of pressure in an injection well, the more permeable section of a formation bleeds down or decreases in pressure more rapidly than the less permeable section. If a well is shut in after such an initial pressure decrease, the less permeable section continues to bleed (since it is temporarily at a higher pressure) and forces the plugging agent into the more permeable section, the latter being at a lower pressure because it bled down more rapidly initially. Thus, by injecting siliconate solution into a formation, and decreasing the pressure or shutting in the input well, siliconate which originally enters the more permeable section remains there and a portion of the siliconate which enters the less permeable section bleeds into the more permeable section, thereby giving the more permeable portion of the formation substantially a double treatment with plugging agent. Following this type of siliconate injection a precipitation acid is then injected in much the same way and the more permeable portion is plugged to a greater extent than is the less permeable portion.

I claim:

1. A method for carrying out a water flooding secondary crude oil recovery operation from a crude oil and water containing formation wherein water is injected through a water input well and thence into the oil and water bearing formation, and oil and water flow into an oil out-put well, said oil and water being produced from said out-put well, comprising, injecting an aqueous solution of a water soluble alkali metal methyl siliconate into said input well and thence into at least the water-wet portion of said formation whereby the water soluble alkali metal methyl siliconate of said aqueous solution contacts port surface of the water-wet portion of the formation and forms a deposit thereon, and while said portion of said formation is wet with said aqueous solution injecting water into said formation through said input well and producing oil and water from said output well in said secondary recovery operation, said oil and water being produced in a higher oil-to-water ratio than prior to injection of said aqueous solution into said formation.

2. In the method of claim 1 wherein said alkali metal methyl siliconate is sodium methyl siliconate.

3. In the method of claim 1 wherein said alkali metal methyl siliconate is potassium methyl siliconate.

4. In the method of claim 1 wherein said alkali metal methyl siliconate is lithium methyl siliconate.

References Cited in the file of this patent

UNITED STATES PATENTS

| | | |
|---|---|---|
| 2,265,962 | Bent et al. | Dec. 9, 1941 |
| 2,272,672 | Kennedy | Feb. 10, 1942 |
| 2,272,673 | Kennedy | Feb. 10, 1942 |
| 2,439,833 | Wagner | Apr. 20, 1948 |
| 2,507,200 | Elliot et al. | May 9, 1950 |
| 2,587,636 | MacMullen | Mar. 4, 1952 |
| 2,614,635 | Williams et al. | Oct. 21, 1952 |
| 2,633,919 | Bauer et al. | Apr. 7, 1953 |

UNITED STATES PATENT OFFICE
Certificate of Correction

Patent No. 2,816,610                                  December 17, 1957

Henry B. Fisher

It is hereby certified that error appears in the printed specification of the above numbered patent requiring correction and that the said Letters Patent should read as corrected below.

Column 2, line 72, the formula should appear as shown below instead of as in the patent—

$$[CH_3Si(OH)_2O]^-[Na]^+$$

column 5, line 16, claim 1, for the word "port" read —pore—.

Signed and sealed this 26th day of August 1958.

[SEAL]

Attest:
KARL H. AXLINE,
*Attesting Officer.*

ROBERT C. WATSON,
*Commissioner of Patents.*